United States Patent
Winkler et al.

(10) Patent No.: US 9,989,159 B2
(45) Date of Patent: Jun. 5, 2018

(54) VENT ASSEMBLY AND METHOD FOR A DIGITAL VALVE POSITIONER

(71) Applicant: FISHER CONTROLS INTERNATIONAL LLC, Marshalltown, IA (US)

(72) Inventors: Richard J. Winkler, Marshalltown, IA (US); Kenneth W. Junk, Marshalltown, IA (US); Shannon E. Jelken, Marshalltown, IA (US); Francis C. Roessler, Marshalltown, IA (US); Christopher J. Mack, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 27 days.

(21) Appl. No.: 14/701,072

(22) Filed: Apr. 30, 2015

(65) Prior Publication Data
US 2015/0316158 A1 Nov. 5, 2015

Related U.S. Application Data

(60) Provisional application No. 61/987,419, filed on May 1, 2014.

(51) Int. Cl.
*F16K 15/00* (2006.01)
*F16K 31/12* (2006.01)
(Continued)

(52) U.S. Cl.
CPC ............ *F16K 15/00* (2013.01); *F16K 15/148* (2013.01); *F16K 31/12* (2013.01); *F16K 47/04* (2013.01);
(Continued)

(58) Field of Classification Search
CPC ........ F16K 15/00; F16K 15/148; F16K 31/12; F15B 21/008
(Continued)

(56) References Cited

U.S. PATENT DOCUMENTS

| 195,003 | A | * | 9/1877 | Guels | F01N 1/165 137/543.13 |
| 297,066 | A | * | 4/1884 | Coale | F01N 1/165 137/382 |

(Continued)

FOREIGN PATENT DOCUMENTS

| DE | 3240710 A1 | 5/1984 |
| DE | 102008015763 A1 | 1/2009 |
| DE | 102013100778 B3 | 3/2014 |

OTHER PUBLICATIONS

International Preliminary Report on Patentability for Application No. PCT/US2015/028692 dated Nov. 1, 2016.
(Continued)

*Primary Examiner* — Craig Schneider
*Assistant Examiner* — P. Macade Nichols
(74) *Attorney, Agent, or Firm* — Marshall, Gerstein & Borun LLP

(57) ABSTRACT

A digital valve positioner for use with an actuator. The digital valve positioner includes a housing, at least one exhaust port opening formed in the housing, and a vent assembly operatively coupled to the at least one exhaust port opening. The vent assembly includes a body having a bore, a valve seat surrounding the bore, and a check valve disposed within the bore. The check valve is arranged to shift from a closed position seated against the valve seat to an open position disposed away from the valve seat. A plurality of barriers is disposed around and positioned to enclose the check valve. The plurality of barriers is arranged to prevent an external medium from entering the check valve (Continued)

and to provide a tortuous flow path for the exhaust medium reducing sound through the vent assembly.

17 Claims, 16 Drawing Sheets

(51) Int. Cl.
| | |
|---|---|
| *F16K 47/04* | (2006.01) |
| *F16K 47/08* | (2006.01) |
| *F16K 15/14* | (2006.01) |
| *F15B 21/00* | (2006.01) |
| *F15B 5/00* | (2006.01) |
| *F15B 21/04* | (2006.01) |

(52) U.S. Cl.
CPC .............. *F16K 47/08* (2013.01); *F15B 5/006* (2013.01); *F15B 21/008* (2013.01); *F15B 21/044* (2013.01); *F15B 2211/8616* (2013.01); *Y10T 137/0324* (2015.04); *Y10T 137/86324* (2015.04); *Y10T 137/86485* (2015.04)

(58) Field of Classification Search
USPC ................. 137/516.11, 516.13, 516.15, 512; 251/127; 181/854, 237, 254, 224, 225
See application file for complete search history.

(56) References Cited

U.S. PATENT DOCUMENTS

| 342,962 | A | * | 6/1886 | Hill | F01N 1/165 |
| | | | | | 137/522 |
| 388,766 | A | * | 8/1888 | D'Lanoy | F16K 15/10 |
| | | | | | 137/516.13 |
| 585,084 | A | * | 6/1897 | Cook | F01N 1/165 |
| | | | | | 137/536 |
| 922,986 | A | * | 5/1909 | Westaway | F16K 15/16 |
| | | | | | 137/516.11 |
| 1,342,216 | A | * | 6/1920 | Henig | F16K 15/16 |
| | | | | | 137/516.11 |
| 1,350,610 | A | * | 8/1920 | Henig | F16K 15/16 |
| | | | | | 137/516.11 |
| 2,644,389 | A | * | 7/1953 | Dauphinee | F16L 55/02 |
| | | | | | 181/224 |
| 2,725,075 | A | * | 11/1955 | Irgens | F02D 9/18 |
| | | | | | 137/512.1 |
| 2,731,194 | A | * | 1/1956 | Kent | A47L 5/22 |
| | | | | | 181/225 |
| 3,153,579 | A | * | 10/1964 | Levey | B01D 53/86 |
| | | | | | 181/237 |
| 3,339,668 | A | * | 9/1967 | Trainor | F16L 55/02781 |
| | | | | | 181/237 |
| 3,403,696 | A | * | 10/1968 | Pynchon | F16K 15/148 |
| | | | | | 137/516.13 |
| 4,513,784 | A | * | 4/1985 | Farrand | F16K 15/148 |
| | | | | | 137/516.11 |
| 4,751,980 | A | * | 6/1988 | DeVane | F01N 1/04 |
| | | | | | 181/224 |
| 5,014,750 | A | * | 5/1991 | Winchell | A61M 5/141 |
| | | | | | 138/42 |
| 5,332,872 | A | * | 7/1994 | Ewanek | F04D 29/663 |
| | | | | | 181/224 |
| 5,439,021 | A | | 8/1995 | Burlage et al. | |
| 6,354,327 | B1 | * | 3/2002 | Mayhew | F15B 9/09 |
| | | | | | 137/596 |
| 7,516,043 | B2 | * | 4/2009 | Junk | G05B 19/0428 |
| | | | | | 701/31.4 |
| 7,556,238 | B2 | * | 7/2009 | Seberger | F16K 37/0083 |
| | | | | | 251/129.04 |
| 8,720,472 | B2 | * | 5/2014 | Kito | F16K 24/044 |
| | | | | | 137/202 |
| 9,170,238 | B2 | * | 10/2015 | Anderson | G01N 29/14 |
| 2005/0109395 | A1 | * | 5/2005 | Seberger | G05B 9/02 |
| | | | | | 137/8 |
| 2005/0211319 | A1 | * | 9/2005 | Kobetsky | B65D 77/225 |
| | | | | | 137/854 |
| 2005/0229593 | A1 | | 10/2005 | Matsumoto et al. | |
| 2006/0054380 | A1 | * | 3/2006 | Doll | E04F 17/04 |
| | | | | | 181/225 |
| 2007/0267589 | A1 | | 11/2007 | Downing | |
| 2013/0327403 | A1 | * | 12/2013 | Jensen | F16K 31/12 |
| | | | | | 137/1 |
| 2015/0192931 | A1 | * | 7/2015 | Grumstrub | G05D 16/202 |
| | | | | | 137/12 |
| 2015/0316158 | A1 | * | 11/2015 | Winkler | F16K 47/08 |
| | | | | | 137/2 |

OTHER PUBLICATIONS

International Search Report and Written Opinion, corresponding International Application No. PCT/US2015/028692, dated Jul. 20, 2015.

* cited by examiner

VENT ASSEMBLY AND METHOD FOR A DIGITAL VALVE POSITIONER

FIELD OF THE DISCLOSURE

The present invention relates generally to digital valve positioners, and, more specifically, to a vent assembly for a high capacity digital valve positioner.

BACKGROUND OF THE DISCLOSURE

Distributed process control systems, like those used in chemical, petroleum or other processes, typically include one or more process controllers communicatively coupled to one or more field devices via analog, digital or combined analog/digital buses. The field devices, which may be, for example, valves, valve positioners, e.g., digital valve positioners, and transmitters, e.g., temperature, pressure, level and flow rate sensors, are located within the process environment and perform process functions such as opening or closing valves and measuring process parameters. Smart field devices, such as the field devices conforming to the well known FOUNDATION® Fieldbus protocol may also perform control calculations, alarming functions, and other control functions commonly implemented within the controller. The process controllers receive signals indicative of process measurements made by the field devices and/or other information pertaining to the field devices. The controller then executes a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process plant.

More specifically, a process control network or system includes one or more process controllers connected to one or more host workstations or computers (which may be any type of personal computer, workstation or other computer) and to a data historian via a communication connection. The communication connection may be, for example, an Ethernet communication network or any other desired type of private or public communication network. Each of the controllers is connected to one or more input/output (I/O) devices each of which, in turn, is connected to one or more field devices, such as a digital valve positioner. As one of skill in the art will appreciate, the process control system could include any other number of controllers and any desired number and types of field devices. Of course, the controllers are communicatively connected to the field devices using any desired hardware and software associated with, for example, standard 4-20 ma devices and/or any smart communication protocol such as the Fieldbus or HART protocols. As is generally known, the controllers, which may be, by way of example only, DeltaV™ controllers sold by Fisher Rosemount Systems, Inc., implement or oversee process control routines or control modules stored therein or otherwise associated therewith and communicate with the devices to control a process in any desired manner.

As noted, an exemplary field instrument of the process control system is the digital valve positioner. As is well known to persons having ordinary skill in the art, the digital valve positioner converts an input current signal into a pneumatic output pressure to an actuator to which the digital valve positioner is operatively coupled. In addition to this normal function, the digital valve positioner also uses a communications protocol, such as the HART communications protocol, to give easy access to information critical to the process operation. In one example, the digital valve positioner provides comprehensive valve diagnostic alerts that are easily accessed via a field communicator and delivers notification of current or potential equipment issues to an asset management system. For example, the alerts assist in identification and notification of several situations including: (1) valve travel deviation due to excess valve friction or galling; and (2) valve travel above or below a specified point. The alerts are stored in a memory on board the digital valve positioner.

One trend in the digital valve positioner market specifically, and the electro-pneumatic instrument market generally, is to design instruments with significantly greater flow capacities than conventional instruments. For example, conventional digital valve positioners typically have a flow coefficient (Cv) of 0.3, while higher flow capacity digital valve positioners have a flow coefficient (Cv) ranging from 1.2 to 6.4. This higher flow capability means that the pneumatic porting in the product, e.g., supply porting, output porting, and exhaust porting, has to be significantly larger than conventional digital valve positioners, for example.

Such larger porting, however, can lead to a greater chance for dirt and moisture and any other external medium in the environment to migrate into the digital valve positioner, which can adversely affect the operation of internal devices of the digital valve positioner. Specifically, the exhaust ports of the digital valve positioner are prime areas where dirt and moisture and other external media can enter the digital valve positioner. In addition, higher flow rates of the higher capacity digital valve positioner generate more noise, such that the noise levels are directly increasing in proportion to the increasing flow rate.

SUMMARY OF THE DISCLOSURE

In accordance with a first exemplary aspect of the disclosure, a digital valve positioner for use with an actuator is disclosed. The digital valve positioner includes a housing, at least one exhaust port opening formed in the housing, and a vent assembly operatively coupled to the at least one exhaust port opening. The vent assembly includes a body operatively coupled to the at least one exhaust port opening, the body including a bore, and a valve seat surrounding the bore. A check valve is disposed within the bore, the check valve arranged to shift from a closed position seated against the valve seat to an open position disposed away from the valve seat when an exhaust medium flows through the at least one exhaust port opening. In addition, a plurality of barriers is disposed around the check valve and positioned to enclose the check valve, the plurality of barriers arranged to prevent an external medium from entering the check valve and to provide a tortuous flow path for the exhaust medium reducing sound through the vent assembly.

According to another exemplary aspect of the present disclosure, a digital valve positioner for use with an actuator is disclosed, the digital valve positioner comprising a housing, at least one exhaust port opening formed in the housing, and a vent assembly operatively coupled to the at least one exhaust port opening. The vent assembly includes a body operatively coupled to the at least one exhaust port opening, the body including a bore, and a valve seat surrounding the bore. A check valve is disposed within the bore, the check valve arranged to shift from a closed position seated against the valve seat to an open position disposed away from the valve seat when an exhaust medium flows through the at least one exhaust port opening. In addition, a cap is removably secured to the body, the cap having a plurality of barriers extending therefrom and disposed around the check valve to enclose the check valve, the cap and the plurality of barriers arranged to prevent an external medium from entering the check valve and to provide a tortuous flow path for the exhaust medium reducing sound through the vent assembly.

According to a further exemplary aspect of the present disclosure, a vent assembly for a digital valve positioner operatively coupled to an actuator is disclosed. The vent assembly comprises a body having an inlet, an outlet, a bore disposed between the inlet and the outlet, a plurality of apertures surrounding the bore, and a valve seat surrounding the plurality of apertures. The body is adapted to be operatively secured to an exhaust port opening of the digital valve positioner. The vent assembly further comprises an umbrella valve disposed within the bore, the umbrella valve biased in a closed position, such that the umbrella valve is shiftable between the closed position seated against the valve seat and an open position disposed away from the valve seat when an exhaust medium flows through the inlet of the body. In addition, an enclosure is disposed around the umbrella valve and positioned to enclose the umbrella valve, the enclosure comprising a plurality of barriers arranged to prevent an external medium from entering the umbrella valve and to provide a tortuous flow path for the exhaust medium reducing sound through the vent assembly without affecting flow capacity.

According to yet another exemplary aspect, a method of venting a digital valve positioner operatively coupled to an actuator is disclosed. The digital valve positioner comprises a housing and at least one exhaust port opening formed in the housing. The method comprises providing a vent assembly comprising a check valve surrounded by a plurality of barriers and operatively securing the vent assembly to the at least one exhaust port opening. The method further comprises directing an exhaust medium into the check valve and through the plurality of barriers, reducing the sound of the exhaust medium flowing through the vent assembly, and preventing an external medium from entering the check valve without affecting the flow capacity of the digital valve positioner.

In further accordance with any one or more of the exemplary aspects, a digital valve positioner, an actuator, and/or a vent assembly of this disclosure optionally may include any one or more of the following further preferred forms.

In some preferred forms, the body is disposed over the at least one exhaust port and includes an outer end surface. The body may define an inlet, an outlet and a bore disposed between the inlet and the outlet. In addition, a plurality of apertures may be disposed in the outer end surface and around the bore. The at least one exhaust port opening may comprise two exhaust port openings, and the body may be disposed over the at least two exhaust port openings. Each barrier of the plurality of barriers may include an elongate protrusion extending from the outer end surface of the body and having a first end and a second end. At least one of the first and second ends overlaps with one or more of the first and second ends of another elongate protrusion of the plurality of barriers to enclose the check valve. The vent assembly may further comprise a cap disposed over the plurality of barriers to further enclose the check valve and reduce sound through the vent assembly, and a screen may be disposed between the body and the cap, the screen allowing the exhaust medium flowing through the plurality of barriers to be released to the atmosphere. The check valve may comprise an umbrella check valve. The check valve is positioned in the closed position, such that when the exhaust medium flows through the at least one exhaust port opening, the exhaust medium is directed through the plurality of apertures and into the check valve, shifting the check valve to the open position to release exhaust medium through the plurality of barriers and into the atmosphere.

In some preferred forms, the body may further include a second bore, a second valve seat surrounding the second bore, and a second check valve disposed within the bore. The second check valve is arranged to shift from a closed position seated against the valve seat to an open position disposed away from the valve seat when the exhaust medium flows through the at least one exhaust opening. The plurality of barriers is disposed around the second check valve and positioned to enclose the second check valve, preventing the external medium from entering the second check valve.

In some preferred forms, the cap comprises a top face and a bottom face, and the bottom face has a concave section adapted to receive the check valve when the check valve is in an open position. The plurality of barriers may comprise a plurality of posts, and the plurality of posts extends from the bottom face and surrounds the check valve. Each post of the plurality of posts is offset from the other posts to enclose the check valve and to provide no line-of-sight between the external medium and the check valve.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION OF THE DISCLOSURE

Generally, a digital valve positioner for use with an actuator is disclosed. The digital valve positioner includes a housing, at least one exhaust port opening formed in the housing, and a vent assembly operatively coupled to the at least one exhaust port opening. As explained in more detail below, the vent assembly both protects the exhaust port opening from the ingress of any external medium, such as dirt, moisture, rain, wind, hail or other external material in the environment, and reduces the noise levels generated by high flow of an exhaust medium through the exhaust port. The vent assembly achieves such benefits without affecting the flow capacity of the digital valve positioner.

Figure 1:
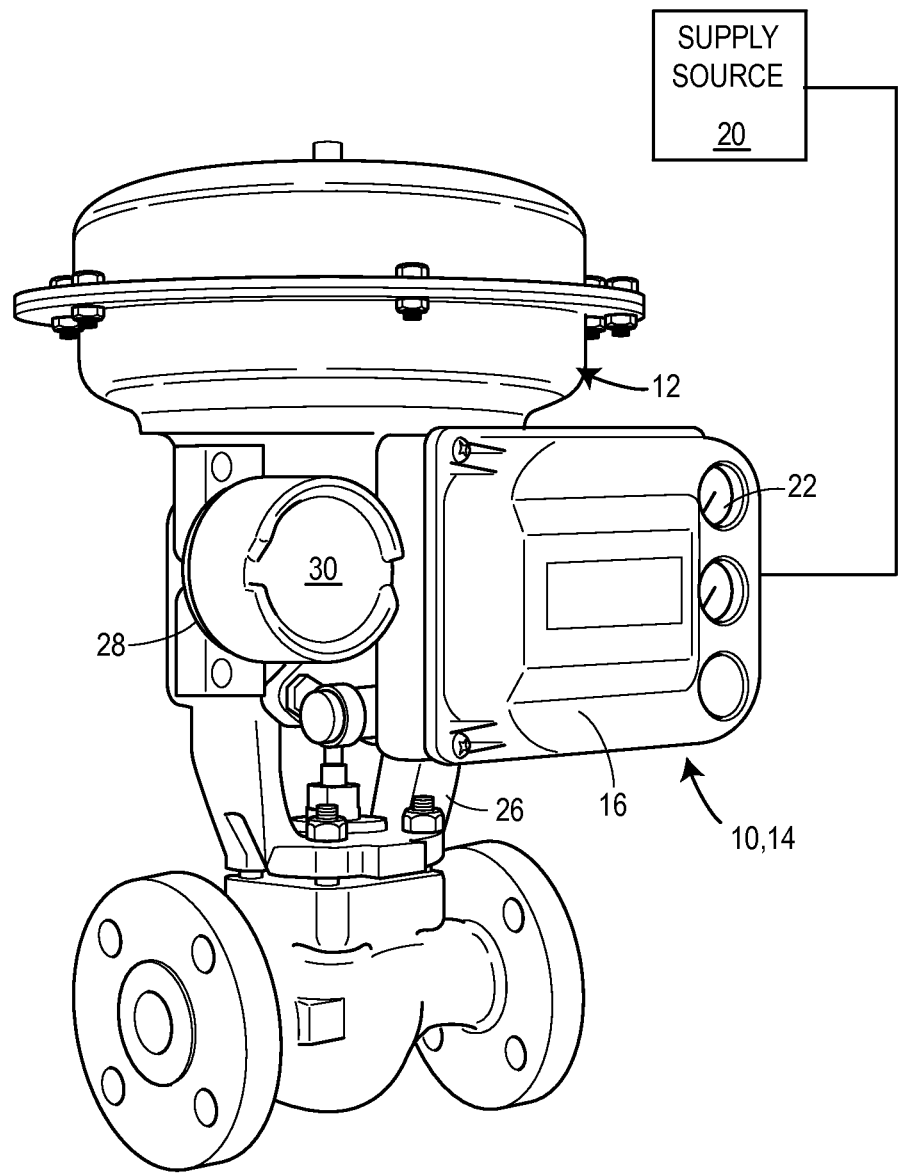
FIG. 1 is a perspective view of a digital valve positioner of the present disclosure operatively coupled to an actuator.

Referring now to FIG. 1, an exemplary field instrument 10 mounted to a valve actuator 12 is depicted. The field instrument 10 may be an electro-pneumatic field instrument, such as a digital valve positioner 14. The digital valve positioner 14 includes a main cover 16, a pneumatic relay assembly (not shown) disposed under the cover 16, an I/P module or converter (not shown) also disposed under the cover 16, gauges 22, an electronics module (not shown), a main housing 26, a terminal box 28, and a terminal box cover 30. The digital valve positioner 14 converts an input current signal, such as a two-wire 4-20 mA control signal, into a pneumatic output pressure to the actuator 12.

Figure 2:
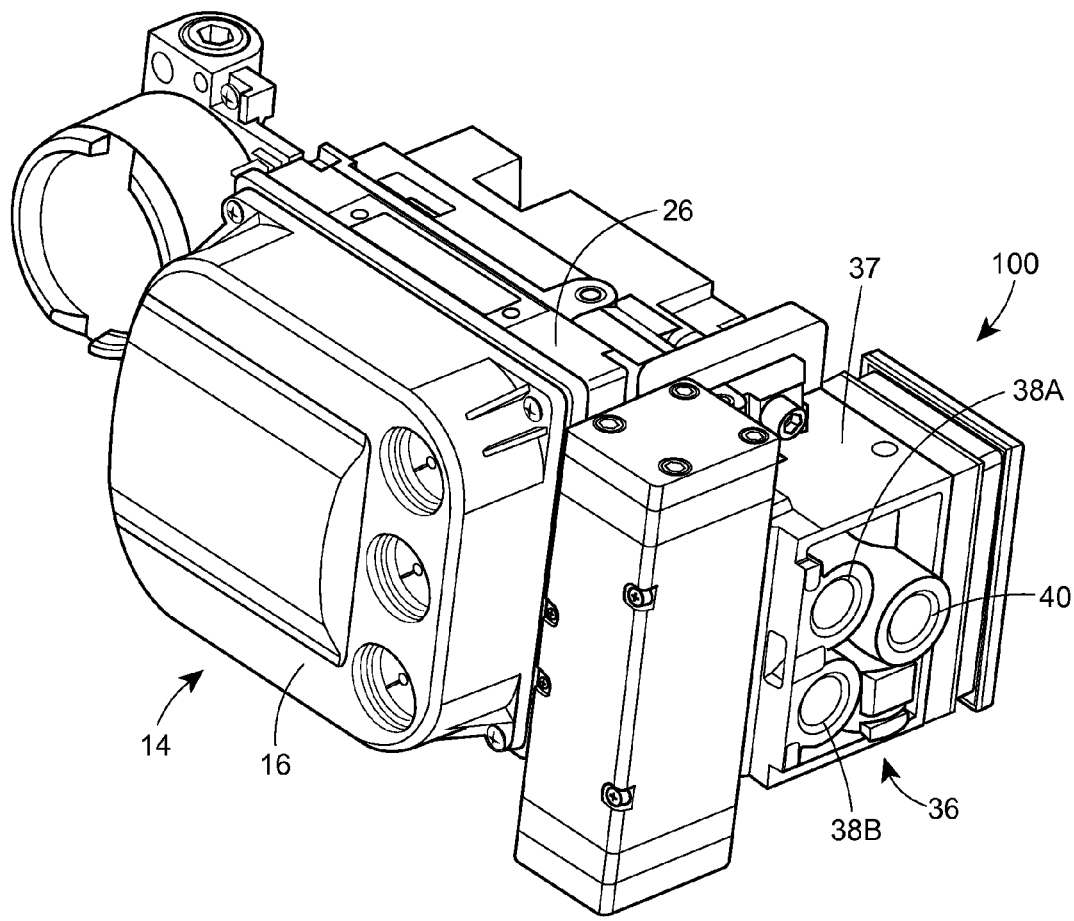
FIG. 2 is a front perspective view of the digital valve positioner of FIG. 1, the digital valve positioner having a vent assembly according to one aspect of the present disclosure.
Figure 3:
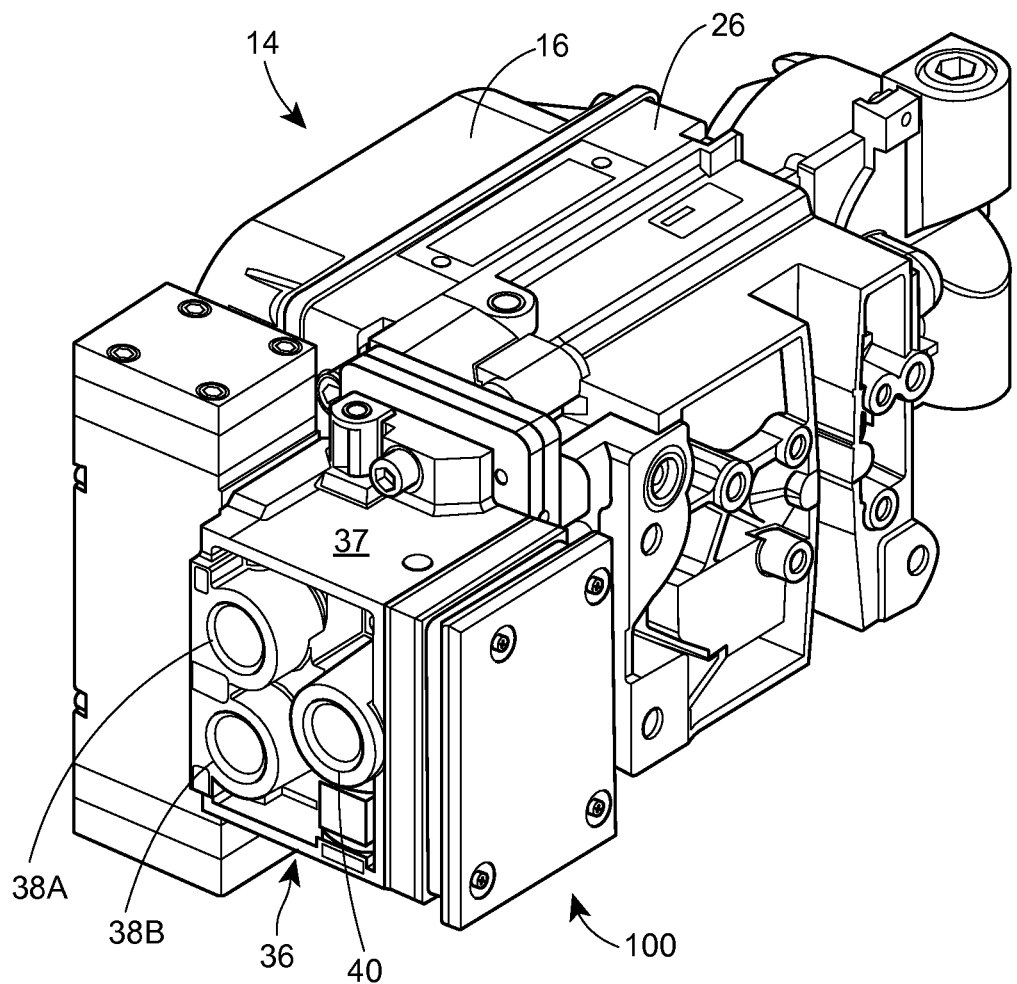
FIG. 3 is a rear perspective view of the digital valve positioner of FIG. 2.
Figure 4:
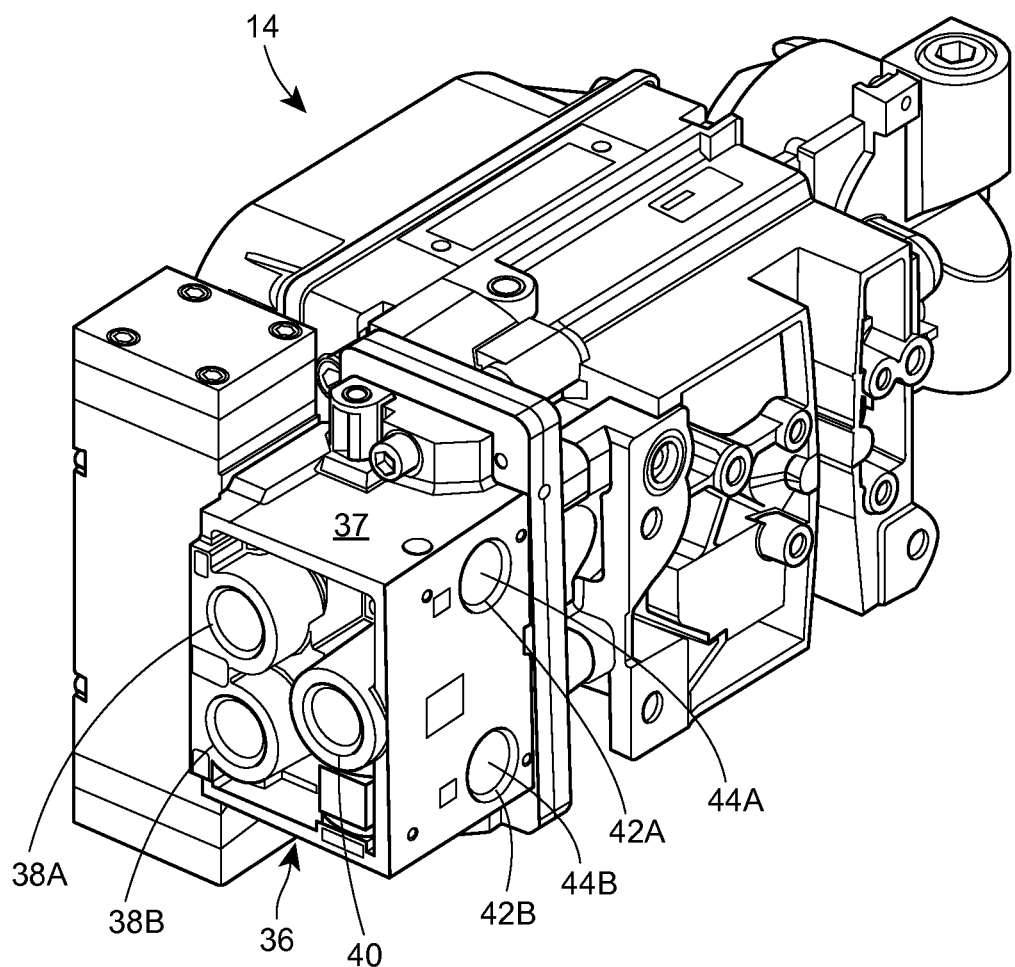
FIG. 4 is a rear perspective view of the digital valve positioner of FIG. 2, the digital valve positioner having the vent assembly removed therefrom.

Referring now to FIGS. 2-4, the digital valve positioner 14 further includes a porting block 36 having two output ports 38A and 38B and a supply port 40. The output ports 38A, 38B are operatively coupled to the actuator 12 in a known manner. In addition, the supply port 40 is operatively coupled to a supply source 20 (FIG. 1). Said another way, the supply port 40 is arranged to be connected to the supply source 20 (FIG. 1) in a known manner and is depicted in schematic form only in FIG. 1.

As further depicted in FIG. 4, the porting block 36 further includes two exhaust ports 42A and 42B that correspond to the output ports 38A and 38B, respectively. In other words, each output port 38A and 38B has a corresponding exhaust port 42A and 42B. In addition, each exhaust port 42A and 42B includes an exhaust port opening 44A, 44B. The porting size of each of the output ports 38A, 38B, supply port 40 and exhaust ports 42A and 42B, and, therefore, the digital valve positioner 14, can accommodate higher flow capacity having a flow coefficient (Cv) of any value included in the range of 1.2 through 3.2. As further depicted in each of FIGS. 2 and 3, the digital valve positioner 14 also includes a vent assembly 100 that is operatively coupled to at least one exhaust port opening 44A, 44B, as explained in more detail below. In one example, and as depicted in FIG. 3, the vent assembly is operatively coupled to both exhaust port openings 44A, 44B.

Figure 5:
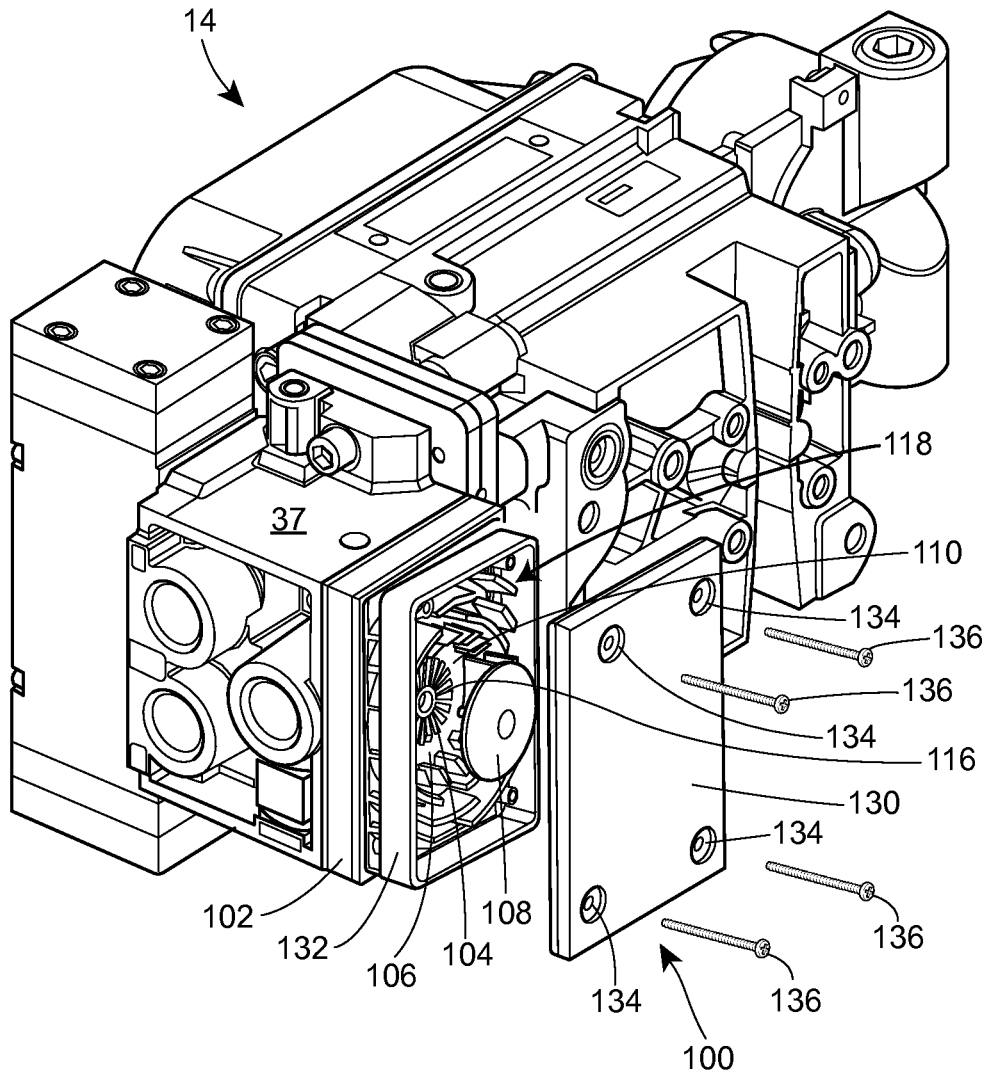
FIG. 5 is a rear perspective view of the digital valve positioner of FIG. 2 having a partially exploded view of the vent assembly of the present disclosure.
Figure 6:
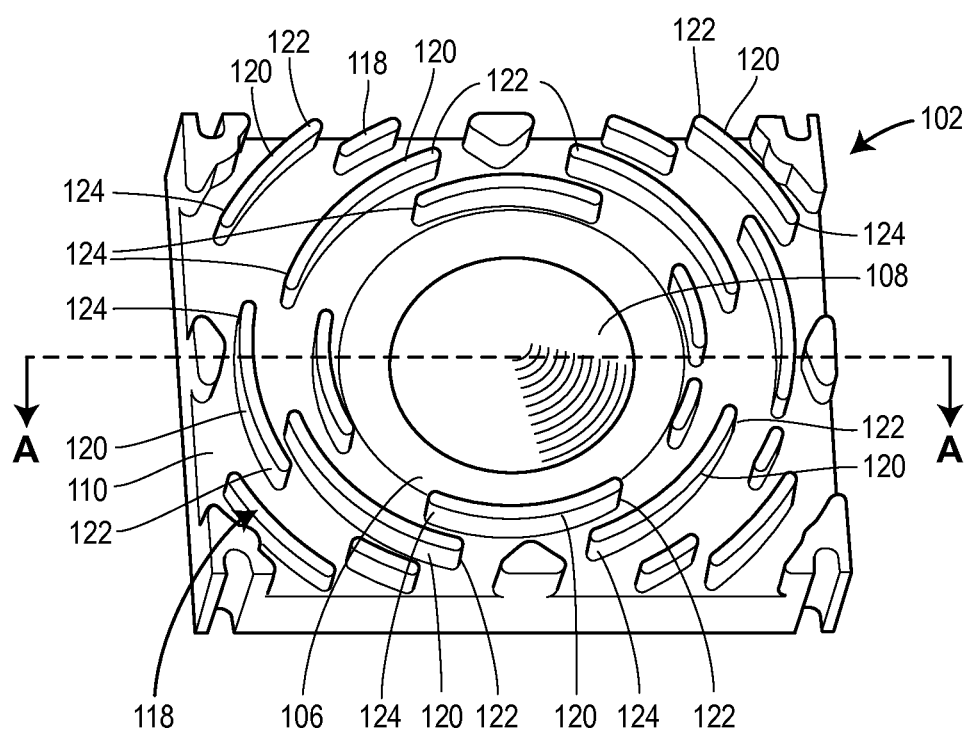
FIG. 6 is a top perspective view of a body of the vent assembly of the present disclosure.
Figure 7:
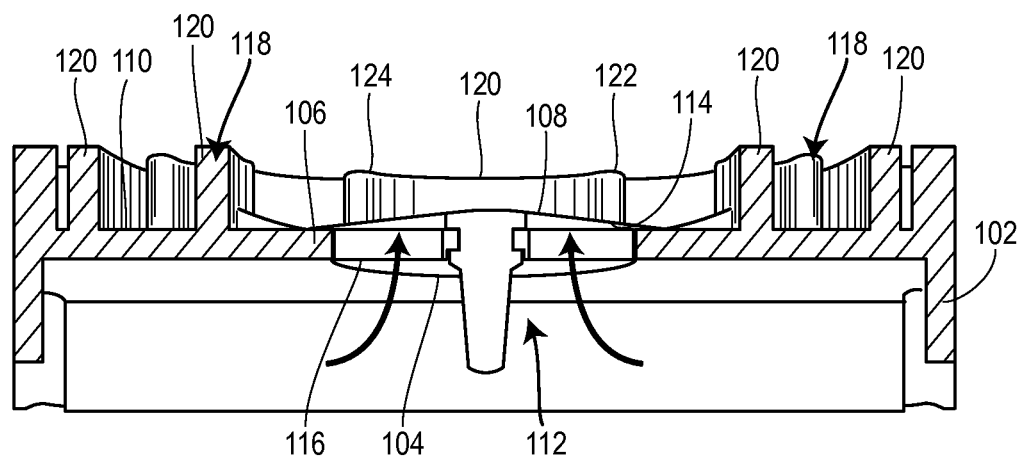
FIG. 7 is a cross-sectional view of the body of the vent assembly of FIG. 6 taken along lines A-A of FIG. 6.

Referring now to FIGS. 5-7, the vent assembly 100 includes a body 102 that is operatively coupled to at least one exhaust port opening 44A, 44B. The body 102 includes a bore 104, a valve seat 106 surrounding the bore 104, and a check valve 108 disposed within the bore 104. The check valve 108 is arranged to shift from a closed position seated against the valve seat 106 (FIG. 7) to an open position disposed away from the valve seat 106 when the exhaust medium flows through the at least one exhaust port opening 44A, 44B. Said another way, the check valve 108 is normally biased in the closed position depicted in FIGS. 6 and 7, and will shift to an open position when the exhaust medium flows into the check valve 108. This pushes the check valve 108 away from the valve seat 106 and allows the exhaust medium to vent through the vent assembly 100. The normally closed position of the check valve 108 helps protect against ingress of dirt and moisture, for example, into the check valve 108, the exhaust port opening 44A, 44B and, thus, the digital valve positioner 14, as explained more below. The body 102 further includes an outer end surface 110, a portion of which may form the valve seat 106, as depicted, for example, in FIGS. 5 and 7.

As further depicted in FIG. 7, the body 102 of the vent assembly 100 further includes an inlet 112 and an outlet 114. The bore 104 is disposed between the inlet 112 and the outlet 114, and a plurality of apertures 116 is disposed in the outer end surface 110 of the body, around the bore 104. The check valve 108 is positioned in the closed position, such that when the exhaust medium flows through the at least one exhaust port opening 44A, 44B, the exhaust medium is directed through the plurality of apertures 116 surrounding the bore 104 and into the check valve 108. This shifts the check valve 108 to the open position to release the exhaust medium to the atmosphere.

The vent assembly 100 further includes an enclosure disposed around the check valve 108. In one example, the enclosure comprises a plurality of barriers 118. The plurality of barriers 118 is disposed around the check valve 108 and positioned to enclose the check valve 108. In addition, the plurality of barriers 118 is arranged to prevent an external medium, such as wind, rain, dirt or any other product from the environment, from entering the exhaust port openings 44A, 44B through the check valve 108. More specifically, while the check valve 108 is normally biased in the closed position in which the check valve 108 is seated against the valve seat 106, a shut off force of the check valve 108 is typically light by design and, therefore, the check valve 108 may be inadvertently opened if directly impinged by an external medium, such as water or wind. Thus, the plurality of barriers 118 protect the check valve 108 from such external media by enclosing the check valve 108 and still allowing for flow of the exhaust medium without reducing or affecting the flow capacity of the digital valve positioner 114.

More specifically, and in the example of FIG. 6, each barrier 118 of the plurality of barriers 118 includes an elongate protrusion 120 extending from the outer end surface 110 of the body 102. In addition, each elongate protrusion 120 may also be curved. Each elongate protrusion 120 includes a first end 122 and a second end 124. At least one of the first and second ends 122, 124 of one protrusion 120 overlaps with one or more of the first and second ends 122, 124 of another protrusion 120 to enclose the check valve 108. The overlapping protrusions 120 of the plurality of barriers 118 provide no line-of-sight between the check valve 108 and an exterior of the body 102 of the vent assembly 100. As a result, direct impingement of any external media, such as rain, wind, or hail, on the check valve 108 is eliminated. As further depicted in FIG. 6, the barriers 118 are also spaced from each other to allow proper venting of exhaust medium from the digital valve positioner 14 when required.

While in the foregoing example each barrier 118 of the plurality of barriers 118 includes an elongate protrusion 120, each barrier 118 of the plurality of barriers 118 may take the shape of a variety of other forms and still fall within the scope of the present disclosure. For example, each barrier 118 of the plurality of barriers 118 may alternatively form a discrete post, each of which is offset from another post such that no line-of-sight is provided between the check valve 108 and an exterior of the body 102 of the vent assembly 100. In yet another example, each barrier 118 of the plurality of barriers 118 may take the form of any other overlapping or offset shape, size or structure and still fall within the scope of the present disclosure.

Further, noise generated by the exhaust medium flowing through the exhaust port openings 44A, 44B, for example, is reduced by directing the exhaust medium into the plurality of barriers 118. More specifically, the vent assembly 100, and in particular, the check valve 108 directing the exhaust medium radially into the plurality of barriers 118, for example, prevents a high velocity exhaust medium, such as air, from forming at an exit of the exhaust port 42A, 42B of the digital valve positioner 14. The high velocity exhaust medium instead is shifted to an area of the check valve 108, which radially directs the exhaust medium outwards and together with the plurality of barriers 118 slows the exhaust medium before it exits to the atmosphere. The plurality of barriers 118 limits the transmission of sound through the vent assembly 100 while still allowing the exhaust medium to exit.

Referring back to FIG. 5, the vent assembly 100 further includes a cap 130 adapted to be disposed over the plurality of barriers 118 to further enclose the check valve 108. Noise generated by the exhaust medium, such as air flow, through the exhaust port opening 44 is further reduced by a combination of both the plurality of barriers 118 and the cap 130. In one example, together the plurality of barriers 118 and the cap 130 provide a tortuous flow path for the noise and exhaust medium. Said another way, and in one example, the plurality of barriers 118 and the cap 130 together form an enclosure around the noise, limiting transmission of the sound through the vent assembly 100 while still allowing the exhaust medium to be released to the atmosphere.

In addition, and in one example, a screen 132, such as a perforated metal screen, is disposed between the body 102 and the cap 130. The screen 132 is permeable, such as air, gas and fluid permeable. As such, the screen 132 further allows any exhaust medium flowing through the plurality of barriers 118 to be released to the atmosphere.

The cap 130 further includes a plurality of holes 134, each of which is adapted to receive a bolt 136 to removeably secure the cap 130 to the body 102 of the vent assembly 100 and the body 102 to the housing 26 of the digital valve positioner 14. More specifically, the body 102 may be mounted to porting block housing 37, as depicted in FIG. 5, for example. While the vent assembly 100 is removably mounted to the housing 26 of the digital valve positioner 14 via the bolts 136, various other mounting or securing mechanisms may alternatively be used without departing from the scope of the present disclosure.

Figure 8:
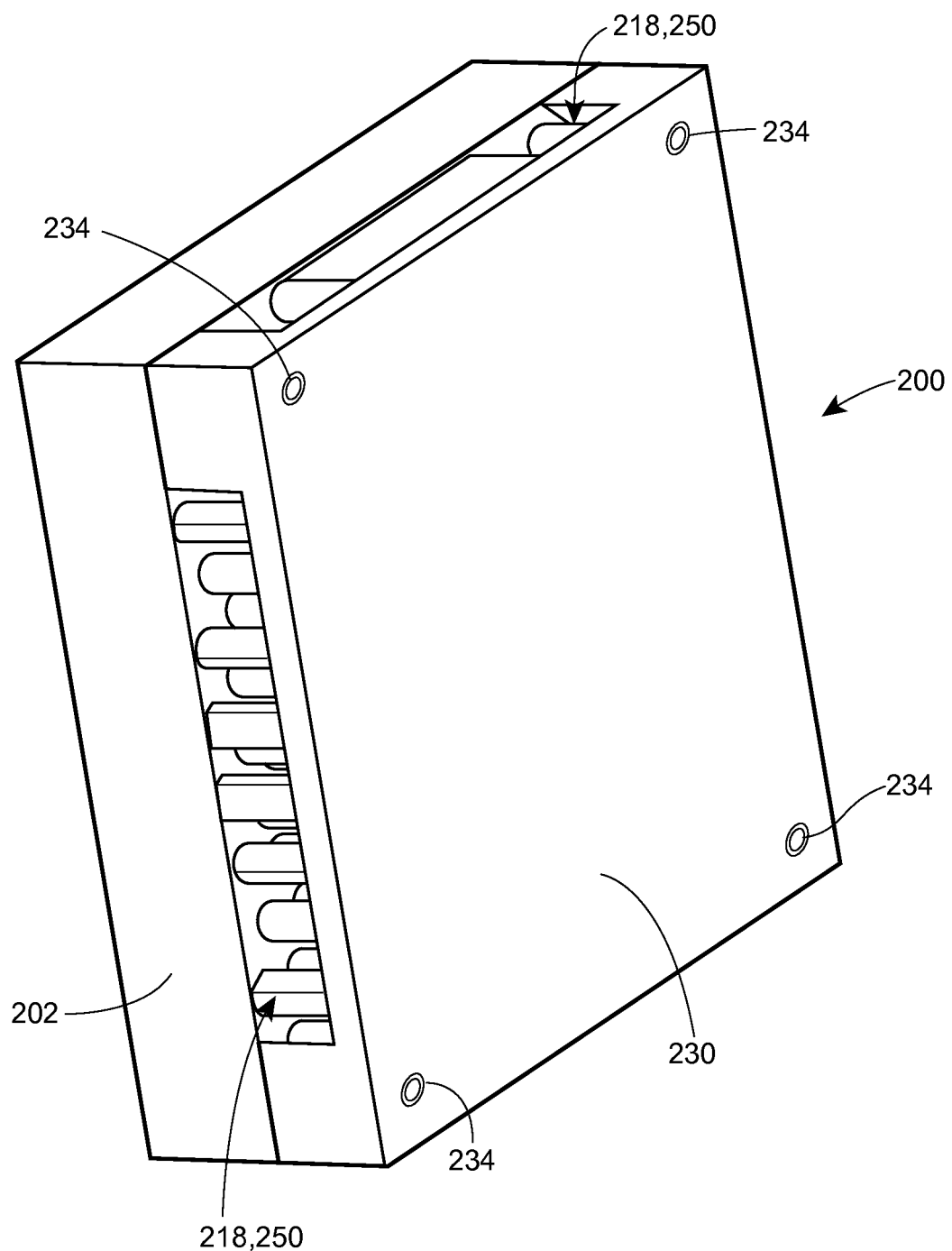
FIG. 8 is a perspective view of another example vent assembly according to another aspect of the present disclosure, the vent assembly adapted to be operatively coupled to the digital valve positioner of FIG. 4.
Figure 9:
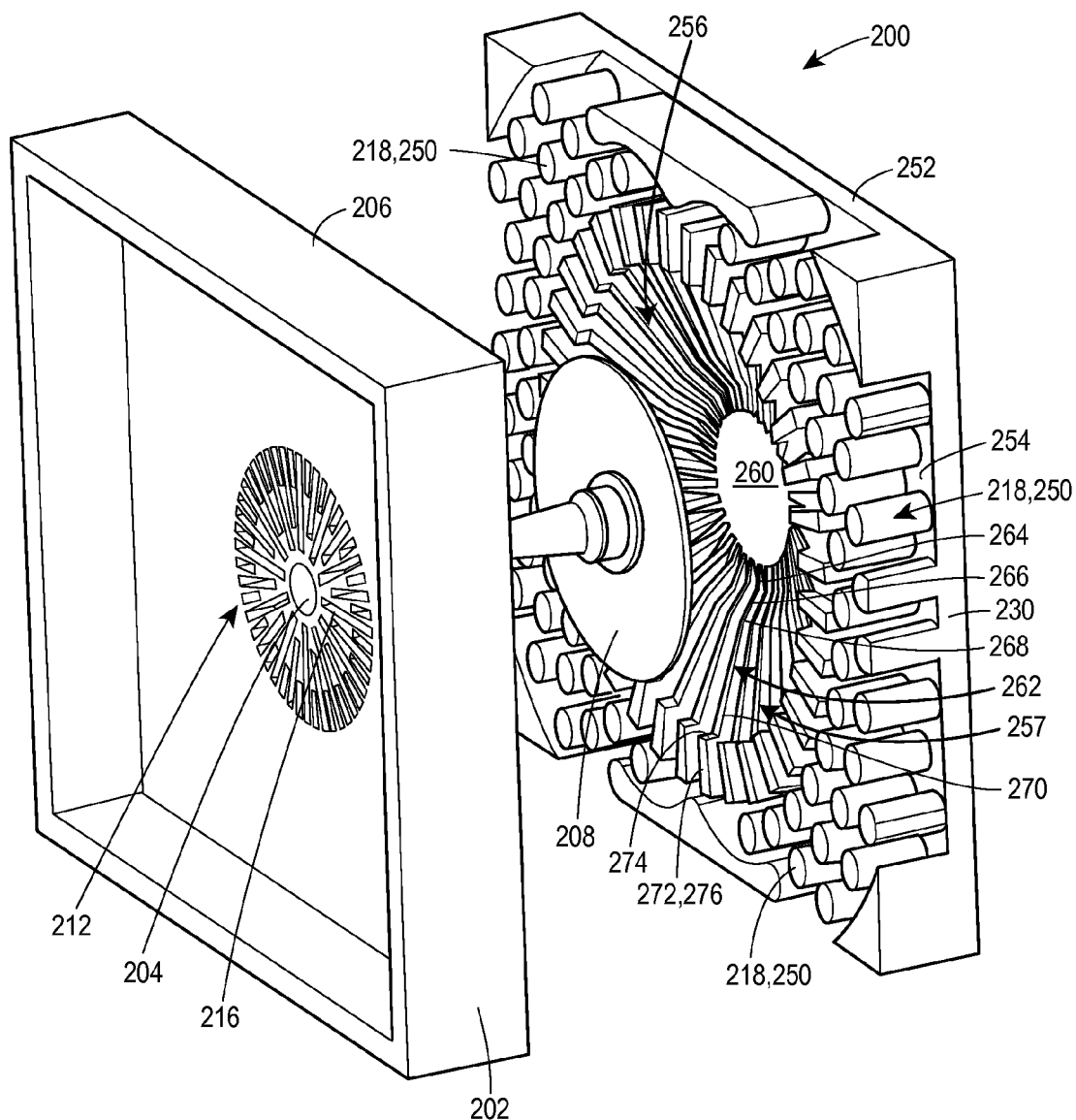
FIG. 9 is an exploded view of the vent assembly of FIG. 8.
Figure 10:
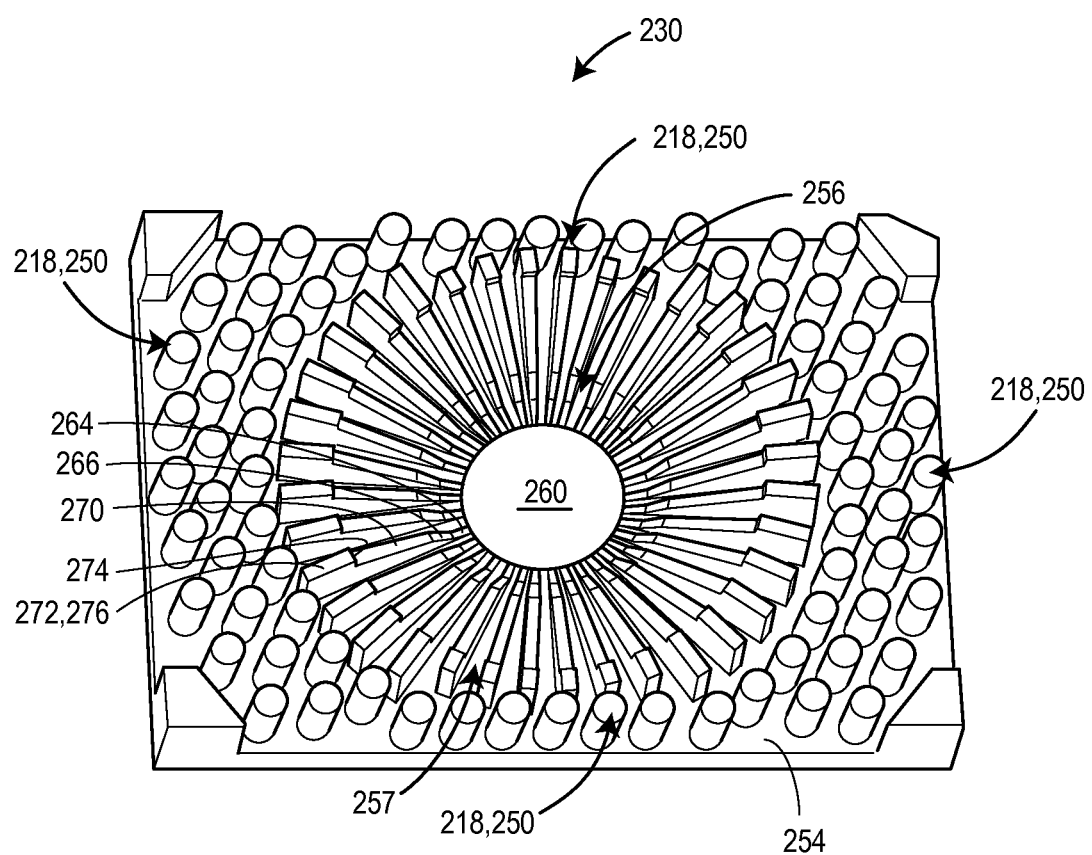
FIG. 10 is a bottom perspective view of a cap of the vent assembly of FIG. 8.
Figure 11:
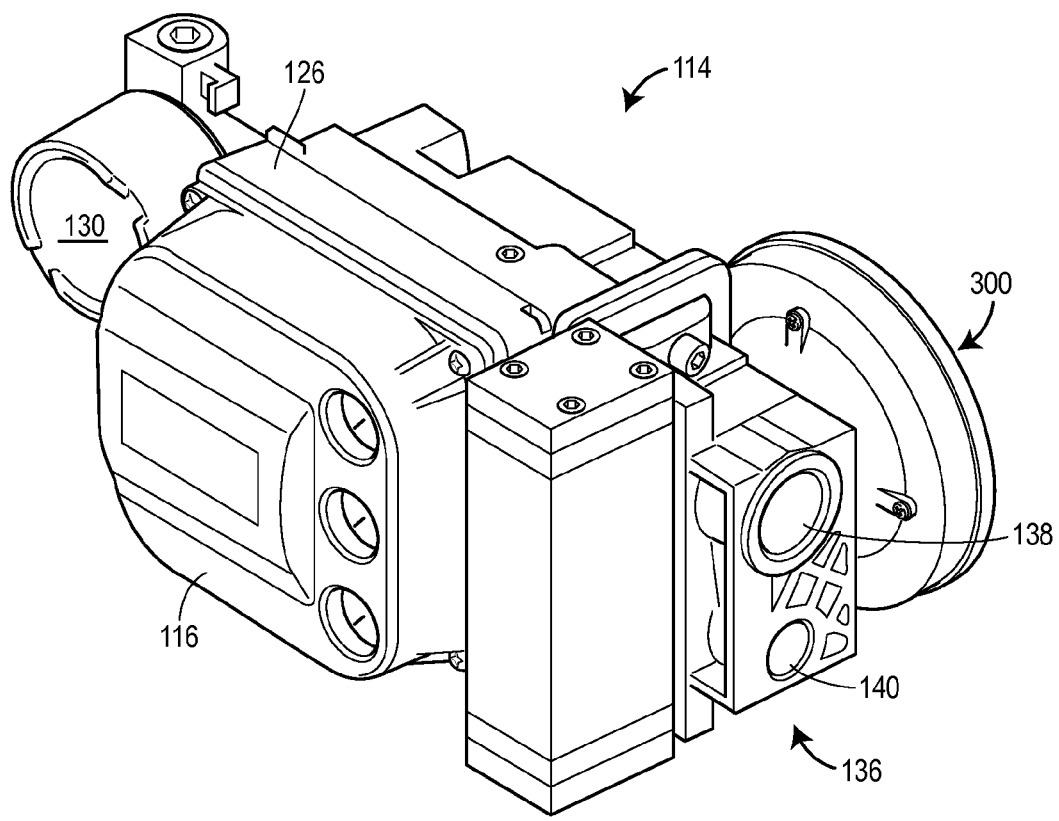
FIG. 11 is a perspective view of a digital valve positioner having another vent assembly according to yet another aspect of the present disclosure.
Figure 12:
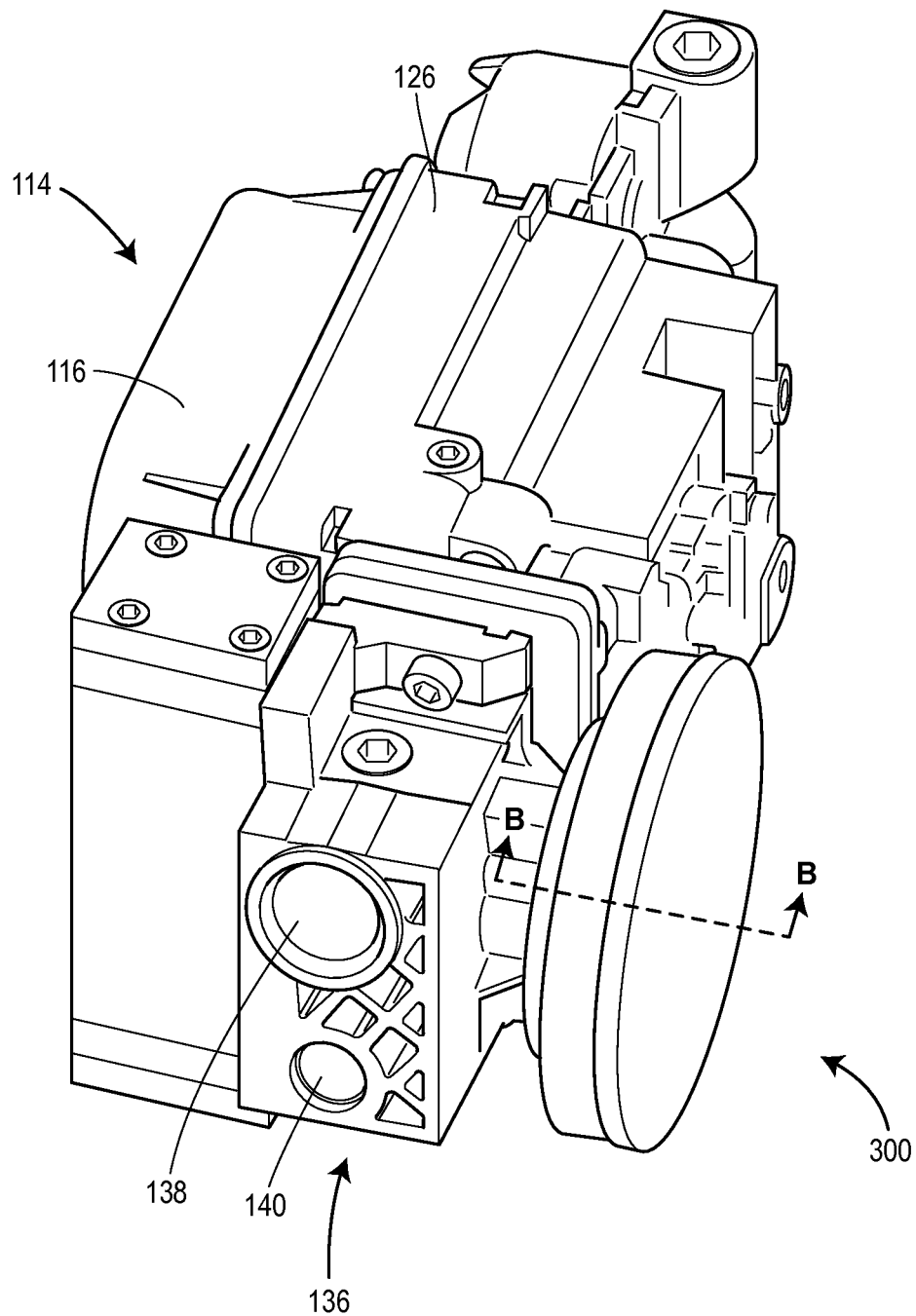
FIG. 12 is a side perspective view of the digital valve positioner of FIG. 11.

Referring now to FIGS. 8-10, a vent assembly 200 according to another aspect of the present disclosure is depicted. The vent assembly 200 is adapted to be operatively coupled to the digital valve positioner 14 of FIG. 4, for example. More specifically, and like the vent assembly 100 of FIGS. 2-7, the vent assembly 200 is also adapted to be operatively coupled to the at least one exhaust port opening 44A, 44B of the digital valve positioner of FIG. 4, for example. Generally, the vent assembly 200 includes essentially the same function and similar structure as the vent assembly 100, with some minor modifications, as explained more below. Generally, the vent assembly 200 includes a cap having a plurality of barriers that form an enclosure around the check valve to prevent external media from entering the exhaust port openings 44A, 44B. The cap having the plurality of barriers also provides a tortuous flow path for the exhaust medium reducing sound through the vent assembly 200 without affecting the flow capacity of the digital valve positioner 14.

For consistency, please note that parts of the vent assembly 200 of FIGS. 8-10 that are the same as parts of the vent assembly 100 of FIGS. 2-7 are similarly numbered. For example, the parts of the vent assembly 200 are numbered one hundred more, e.g., 202 instead of 102, than the same part of the vent assembly 100.

As depicted in FIGS. 8-9, the vent assembly 200 includes a body 202 adapted to be operatively coupled to the at least one exhaust port opening 44A, 44B (FIG. 4) of the digital valve positioner 14. The body 202 includes a bore 204. The vent assembly 200 further includes a valve seat 206 surrounding the bore 204 and a check valve 208 adapted to be disposed within the bore 204. Like the check valve 108 of the vent assembly 100, the check valve 208 is also arranged to shift from a closed position seated against the valve seat 206 to an open position seated away from the valve seat 206 when an exhaust medium flows through the at least one exhaust port opening 44A, 44B.

The vent assembly 200 further includes a protective cover, such as a cap 230, which is adapted to be removably secured to the body 202. The cap 230 includes a plurality of barriers 218 extending therefrom and disposed around the check valve 208 to enclose the check valve 208 when the cap 230 is secured to the body 202 of the vent assembly 200. In the example depicted in FIGS. 9 and 10, the plurality of barriers 218 take the form of a plurality of posts 250. Each post 250 of the plurality of posts 250 is offset from one another to enclose the check valve 208 and to provide no line-of-sight between the external medium to the check valve 208, for example. As one of ordinary skill in the art will appreciate, the plurality of barriers 218 may alternatively take the shape of a variety of other forms, such as an elongate protrusion and/or an elongate protrusion that is curved, and still fall within the scope of the present disclosure.

The cap 230 and the plurality of posts 250 are arranged to prevent an external medium, such as rain, wind or hail, from entering the exhaust port openings 44A, 44B through the check valve 208. In addition, the cap 230 and the plurality of posts 250 are arranged to provide a tortuous flow path for the exhaust medium flowing through the vent assembly 200, reducing sound through the vent assembly 200.

As further depicted in FIGS. 9 and 10, the cap 230 includes a top face 252 and a bottom face 254. The bottom face 254 includes a concave section 256 disposed in a center area of the bottom face 254. The concave section 256 is adapted to receive the check valve 208 when the check valve 208 is in an open position, for example. The concave section 256 may include a plurality of projections 257 extending radially around a bottom surface of the concave section 256 to further accommodate the check valve 208, for example.

In one example, the concave section 256 further includes a center portion 260 from which at least one projection 262 of the plurality of projections 257 extends. In some examples, and as depicted in FIGS. 9 and 10, each projection of the plurality of projections 257 extends from the center portion 260 of the concave section 256. In addition, in another example, the at least one projection 262 includes a first flat section 264 that extends from the center portion 260, a first sloping section 266 that extends from the first flat section 264, and a second flat section 268 that extends from the first sloping section 266. The at least one projection 262 further includes a second sloping section 270 that extends from the second flat section 268 and a raised section 272 that extends from the second sloping section 270. The raised section 272 includes a side surface 274 that extends vertically from the second sloping section 270, such as perpendicular to an end of the second sloping section 270, and a top surface 276. The top surface 276 is flat, but may alternatively be rounded, spherical, or cylindrical in shape and still fall within the scope of the disclosure.

As depicted in FIGS. 9 and 10, the first and second sloping sections 266, 270 of the at least one projection 262 slope upwardly from the center portion 260 of the concave section 256, helping to form the concave shape. For example, the first sloping section 266 slopes upwardly from the first flat section 264 and the second sloping section 270 slopes upwardly from the second flat section 268. While not depicted, one of ordinary skill in the art will appreciate that the first and second sloping sections 266, 270 may slope upwardly at a different angle from the center portion 260 and still fall within the scope of the present disclosure. In addition, each of the first and second flat sections 264, 268, the first and second sloping sections 266, 270, and the raised section 272 may also have a length that is shorter than or longer than the length depicted in FIGS. 9 and 10 and still fall within the scope of the present disclosure.

The plurality of barriers 218, e.g., plurality of posts 250, extends from the bottom face 254 and surrounds the check valve 208. More specifically, the offset posts 250 provide no line-of-sight between the check valve 208 and an exterior of the body 202 of the vent assembly 200. As a result, direct impingement of any external media, such as rain, wind, or hail, on the check valve 208 is eliminated. In addition, and like the barriers 118 of the vent assembly 100, the barriers 218 and the posts 250, for example, are also spaced from each other to allow proper venting of exhaust medium from the digital valve positioner 14 when required.

Like the body 102 of the vent assembly 100, the body 202 is also adapted to be disposed over the at least one exhaust port opening 44A, 44B and includes an outer end surface. The body 202 further defines an inlet 212 and an outlet (not shown) and a plurality of apertures 216 disposed in the outer end surface of the body 202 and around the bore 204.

As depicted in FIG. 8, the cap 230 may also include a plurality of holes 234, each of which is adapted to receive a bolt to removeably secure the cap 230 to the body 202 of the vent assembly 200 and the body 202 to the housing 26 of the digital valve positioner 14. More specifically, the body 202 may be mounted to porting block housing 37 (FIG. 4), such that the body 202 is disposed over both exhaust port openings 44A, 44B. While the vent assembly 200 is removeably mounted to the housing 26 of the digital valve positioner 14 via a bolt, various other mounting or securing mechanisms may alternatively be used without departing from the scope of the present disclosure.

While the vent assemblies 100 and 200 each include check valves 108, 208, in one example the check valves 108, 208 are umbrella valves. In another example, the check valves 108, 208 are umbrella check valves. Other valves capable of achieving the same functions described above relative to check valves 108, 208 may alternatively be used without departing from the scope of the present disclosure.

Referring now to FIGS. 11-16, another vent assembly 300 according to another aspect of the present disclosure is depicted. Like the vent assemblies 100, 200, the vent assembly 300 is also adapted to be operatively coupled to a digital valve positioner 114. More specifically, and like the vent assemblies 100, 200, the vent assembly 300 is also adapted to be operatively coupled to the at least one exhaust port opening of the digital valve positioner 114. Generally, the vent assembly 300 includes essentially the same function and similar structure as the vent assembly 100, with some minor modifications, as explained more below. In addition, the digital valve positioner 114 also includes essentially the same function and structure as the digital valve positioner 14 depicted in FIGS. 1-7, with some minor modifications, as explained in detail below.

For consistency, please note that parts of the vent assembly 300 of FIGS. 11-16 that are the same as parts of the vent assembly 100 of FIGS. 2-7 are similarly numbered. For example, the parts of the vent assembly 300 are numbered two hundred more, e.g., 302 instead of 102, than the same part of the vent assembly 100. In addition, parts of the digital valve positioner 114 of FIGS. 11-16 that are the same as parts of the digital valve positioner 14 of FIGS. 2-7 are likewise similarly numbered, e.g., numbered one hundred more than the digital valve positioner 14.

Figure 13:
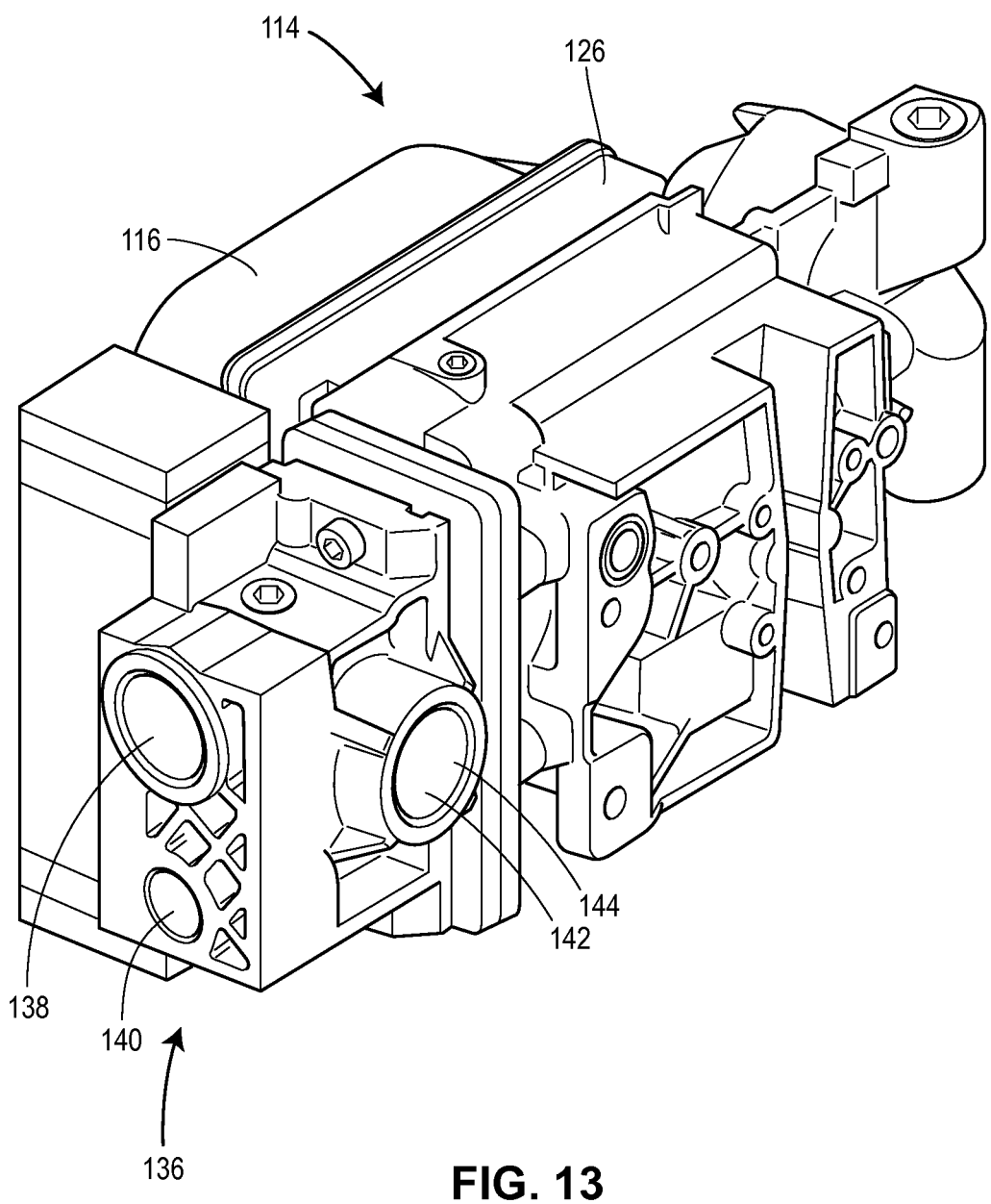
FIG. 13 is a rear perspective view of the digital valve positioner of FIG. 11, the digital valve positioner of the vent assembly removed therefrom.

Referring to FIGS. 11-15, the digital valve positioner 114 includes a cover 116, a housing 126 and a porting block 136. The porting block 136 includes one output port 138 and one supply port 140. Like the digital valve positioner 14, the output port 138 is operatively coupled to an actuator, such as the actuator 12, in a well-known manner. In addition, the supply port 140 is operatively coupled to a supply source, such as the supply source 20 (FIG. 1), also in a well-known manner. As depicted in FIG. 13, the porting block 136 further includes one exhaust port 142 that corresponds to the output port 138. In addition, the exhaust port 142 includes an exhaust port opening 144. The porting size of the output port 138 and the exhaust port 142 are larger than the output ports 38A, 38B and exhaust ports 42A, 42B of the digital valve positioner 14 of FIGS. 2-7 and can, therefore, accommodate higher flow capacity. For example, the digital valve positioner 114 can have a flow coefficient (Cv) of 6.4. As further depicted in FIGS. 11 and 12, for example, the digital valve positioner 114 also includes a vent assembly 300 that is operatively coupled to the exhaust port opening 144, as explained in more detail below.

Figure 14:
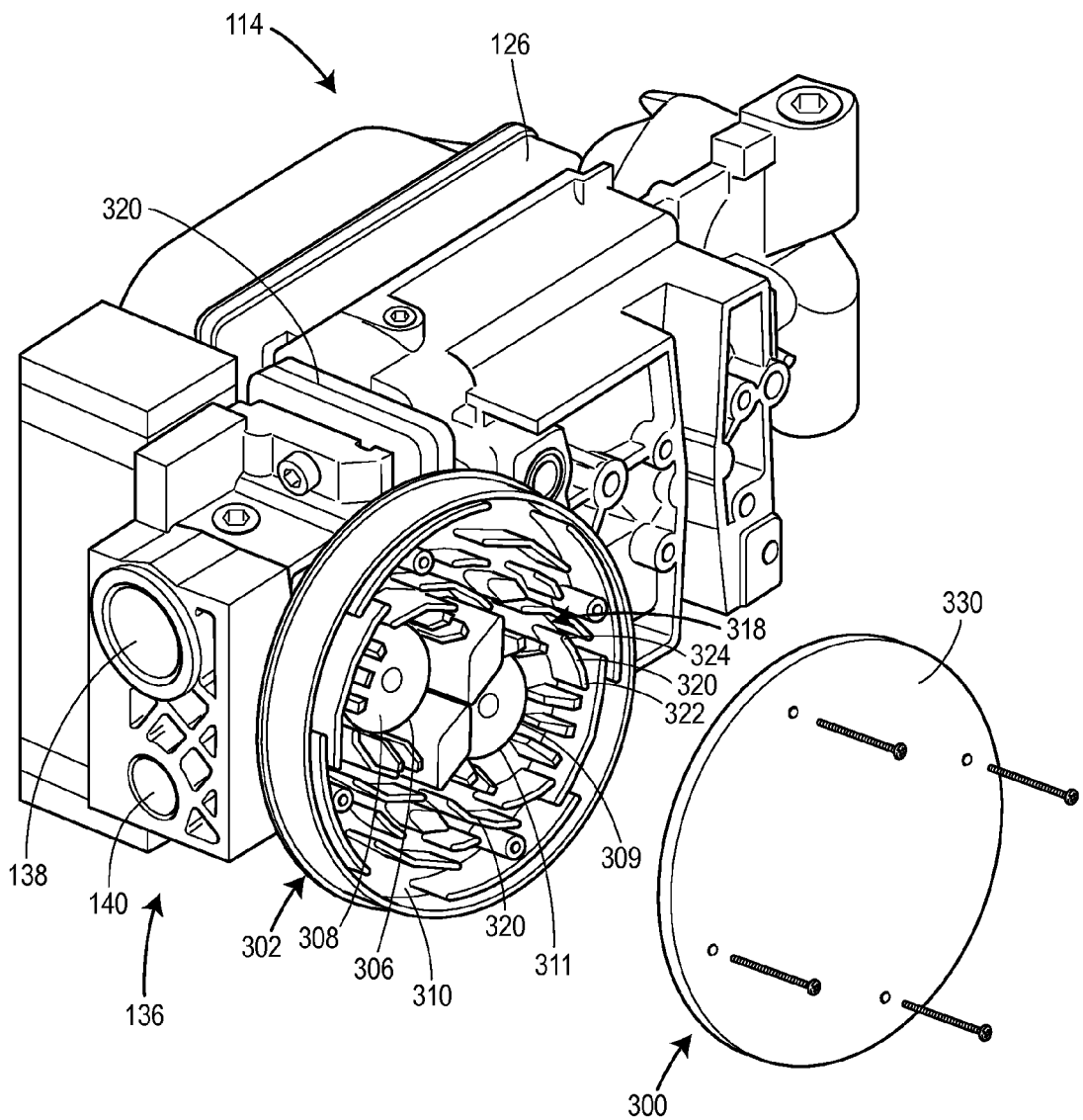
FIG. 14 is a rear perspective view of the digital valve positioner of FIG. 11 having a partially exploded view of the vent assembly.
Figure 15:
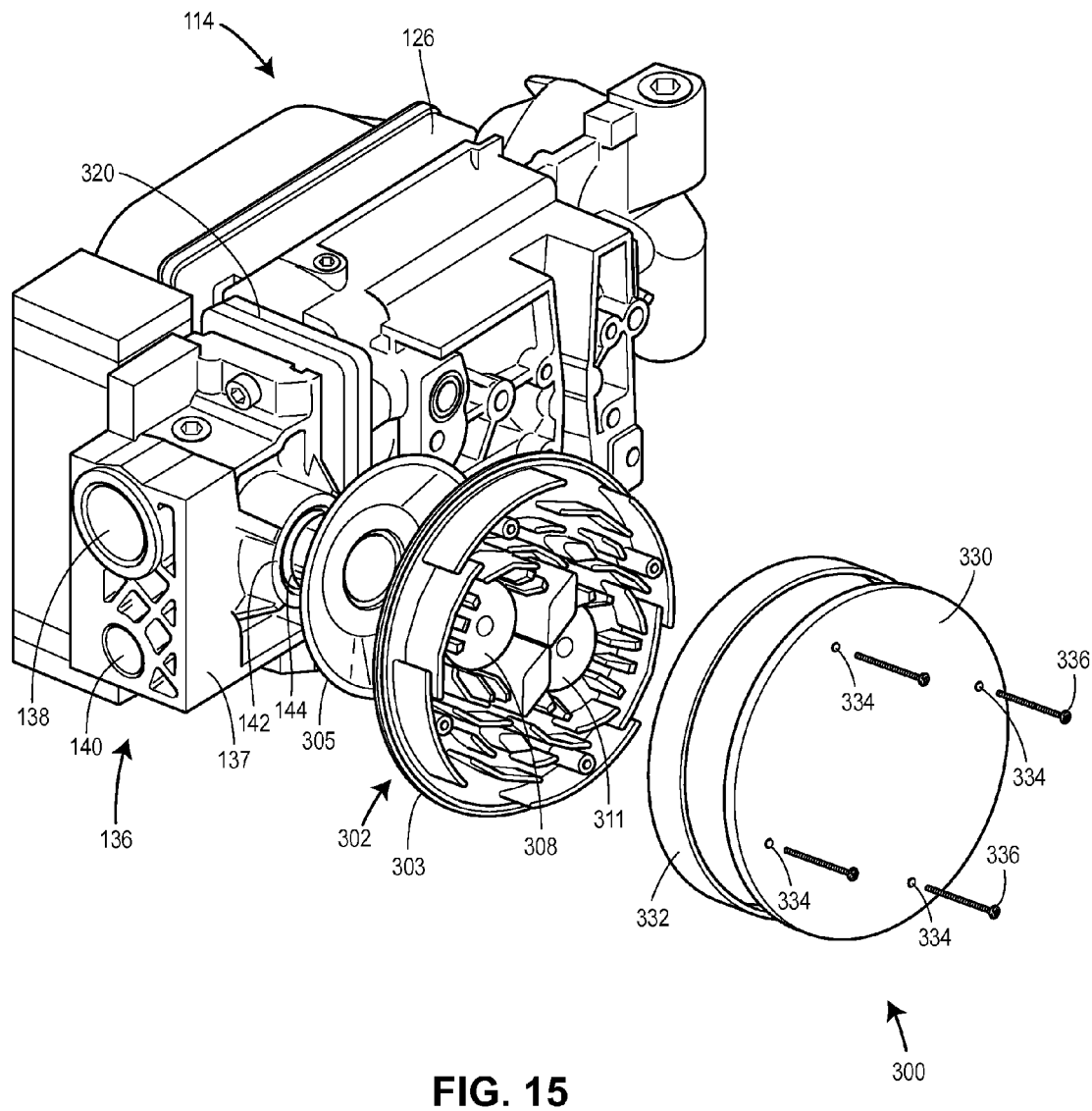
FIG. 15 is another rear perspective view of the digital valve positioner of FIG. 11 having an exploded view of the vent assembly.
Figure 16:
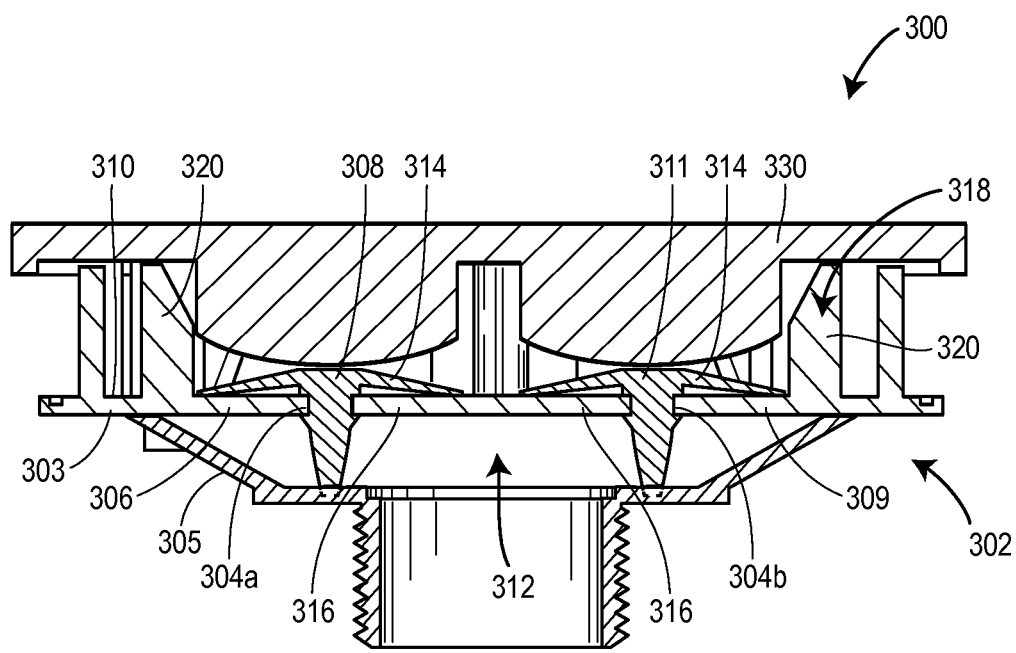
FIG. 16 is a cross-sectional view of the vent assembly of FIG. 12, taken along the line B-B of FIG. 12.

Referring now to FIGS. 14-16, the vent assembly 300 includes a body 302 that is operatively coupled to the exhaust port opening 144. The body 302 includes an upper portion 303 and a lower portion 305. The lower portion 305 includes an extension adapted to be disposed in the exhaust port opening 144, as depicted in FIG. 15. The upper portion 303 includes a first bore 304A (FIG. 16) and a second bore 304B (FIG. 16) adjacent to the first bore 304A. A first valve seat 306 surrounds the first bore 304A and a first check valve 308 is disposed within the first bore 304A. In a similar manner, a second valve seat 309 surrounds the second bore 304B and a second check valve 311 is disposed within the second bore 304B. Both check valves 308, 311 are arranged to shift from a closed position seated against the valve seats 306, 309 to an open position disposed away from the valve seats 306, 309 when an exhaust medium flows through the exhaust port opening 144. Said another way, the check valves 308, 311 are normally biased in the closed positions depicted in FIGS. 14 and 16, and will shift to an open position when exhaust medium flows into the check valves 308, 311, pushing the check valves 308, 311 away from the valve seats 306, 309 and allowing an exhaust medium to vent through the vent assembly 300. The normally closed position of the check valves 308, 311 helps protect against the ingress of external media, into the check valves 308, 311, the exhaust port opening 144, and, thus, the digital valve positioner 114, as explained more below. Like the vent assembly 100, the body 302 further includes an outer end surface 310, a portion of which may form the valve seats 306, 309.

As further depicted in FIG. 16, the body 302 of the vent assembly 300 further includes an inlet 312 and an outlet 314. The bores 304A, 304B are disposed between the inlet 312 and the outlet 314, and a plurality of apertures 316 is disposed in the outer end surface 310 of the body, around the bores 304A, 304B. The check valves 308, 311 are positioned in the closed position, such that when the exhaust medium flows through the at least one exhaust port opening 144, the exhaust medium is directed through the plurality of apertures 116 surrounding the bores 304A, 304B and into the check valves 308, 311. This shifts the check valves 308, 311 to the open position to release the exhaust medium to the atmosphere.

The vent assembly 300 further includes an enclosure disposed around the check valves 308, 311. In one example, the enclosure comprises a plurality of barriers 318. The plurality of barriers 318 is disposed around the check valves 308, 311 and positioned to enclose the check valves 308, 311. In addition, the plurality of barriers 318 is arranged to prevent an external medium, such as wind, rain, dirt or any other product from the environment, from entering the exhaust port opening 144 through the check valves 308, 311. Like the plurality of barriers 118 of the vent assembly 100, the plurality of barriers 318 protect the check valves 308, 311 from any external media by enclosing the check valves 308, 311. The enclosure still allows for flow of the exhaust medium without reducing or affecting the flow capacity of the digital valve positioner 114.

Also like the vent assembly 100, and in the example of FIGS. 14-16, each barrier 318 of the plurality of barriers 318 includes an elongate protrusion 320 extending from the outer end surface 310 of the body 302. As depicted in FIG. 14, for example, each elongate protrusion 320 may also be curved. Further, each elongate protrusion 320 includes a first end 322 and a second end 324. At least one of the first and second ends 322, 324 of one protrusion 320 overlaps with one or more of the first and second ends 322, 324 of another protrusion 320 to enclose the check valves 308, 311. The overlapping protrusions 320 of the plurality of barriers 318 provide no line-of-sight between the check valves 308, 311 and an exterior of the body 302 of the vent assembly 300. As a result, direct impingement of any external media, such as rain, wind, or hail, on the check valves 308, 311 is eliminated. As further depicted in FIGS. 14 and 15, the barriers 318 are also spaced from each other to allow proper venting of exhaust medium from the digital valve positioner 114 when required.

While in the foregoing example, each barrier 318 of the plurality of barriers 318 includes an elongate protrusion 320, each barrier 318 of the plurality of barriers 318 may alternatively take the shape of a variety of other forms and still fall within the scope of the present disclosure. For example, each barrier 318 of the plurality of barriers 318 may alternatively form a discrete post, each of which is offset from another post such that no line-of-sight is provided between the check valves 308, 311 and an exterior of the body 302 of the vent assembly 300. In yet another example, each barrier 318 of the plurality of barriers 318 may take the form of any other overlapping or offset shape, size or structure and still fall within the scope of the present disclosure. In yet another example, each barrier 318 may alternatively extend from an inside surface of a cap 330, as opposed to the outer end surface 310 of the body 302 as depicted, for example, in FIG. 14, and still fall within the scope of the present disclosure.

Further, noise generated by the exhaust medium flowing through the exhaust port opening 144, for example, is reduced by directing the exhaust medium into the plurality of barriers 318. More specifically, the check valves 308, 311 direct the exhaust medium radially into the plurality of barriers 318, which prevents a high velocity exhaust medium from forming at an exit of the exhaust port 142. The high velocity exhaust medium instead is shifted to an area of the check valves 308, 311 that together with the plurality of barriers 318 slow the exhaust medium before it exits to the atmosphere. The plurality of barriers 318 limit the transmission of sound through the vent assembly 100 while still allowing the exhaust medium to exit.

Like the vent assembly 100, and in one example, the enclosure of the vent assembly 300 may further include the cap 330 that is adapted to be disposed over the plurality of barriers 318 to further enclose the check valves 308, 311. Noise generated by the exhaust medium flowing through the exhaust port opening 144 is further reduced by a combination of both the plurality of barriers 318 and the cap 330. In one example, together the plurality of barriers 318 and the cap 330 provide a tortuous flow path for the noise and exhaust medium. Said another way, and in one example, the plurality of barriers 318 and the cap 330 together form an enclosure around the noise, limiting transmission of the sound through the vent assembly 300 while still allowing the exhaust medium to be released to the atmosphere.

In addition, a screen 332 (FIG. 15), such as a perforated metal screen, may be disposed between the body 302 and the cap 330. The screen 332 is permeable, such as air, gas and fluid permeable. As such, the screen 332 helps allow the exhaust medium flowing through the plurality of barriers 318 to be released to the atmosphere.

The cap 330 further includes a plurality of holes 334, each of which is adapted to receive a bolt 336 to removeably secure the cap 330 to the body 302 of the vent assembly 300 and the body 302 to porting block housing 137. While the vent assembly 300 is removeably mounted to the digital valve positioner 114 via the bolts 336, various other mounting or securing mechanisms may be alternatively be used without departing from the scope of the present disclosure. Like the vent assemblies 100, 200, in one example, the check valves 308, 311 of the vent assembly 300 are umbrella valves. In another example, the check valves 308, 311 of the vent assembly 300 are umbrella check valves.

Thus, the plurality of barriers 318 surrounding the check valves 308, 311 effectively prevent an external medium from entering the check valves 308, 311 and provide a tortuous flow path for the exhaust medium flowing from a high capacity digital valve positioner 114 having a flow coefficient (Cv) of 6.4. Said another way, the vent assembly 300 can accommodate the higher flow capacity of the high capacity digital valve positioner 114 and still effectively both prevent exhaust media from entering the check valves 308, 311 and reduce sound through the vent assembly 300.

While not depicted in any of the foregoing figures, one of ordinary skill in the art will appreciate that more than two check valves may be included in the body of a vent assembly and still fall within the scope of the present disclosure. For example, another alternative vent assembly may include a body having three bores, each of which includes a valve seat surrounding the bore and a check valve disposed within the bore and one of a plurality of barriers or plurality of posts surrounding each check valve and forming an enclosure around the same. Such a configuration would provide even further protection against ingress of external media into the digital valve positioner without affecting the flow capacity and also provide further noise reduction.

In view of the foregoing, one of ordinary skill in the art will understand that all the vent assemblies 100, 200 and 300 of the present disclosure may protect internal components of a digital valve positioner 14, 114 and reduce noise levels of exhaust media by providing a vent assembly 100, 200, 300 comprising at least one check valve 108, 208, 308, 311 surrounded by a plurality of barriers 118, 218, 318. The vent assemblies 100, 200 and 300 may further direct exhaust medium into the at least one check valve 108, 208, 308, 311 and through the plurality of barriers 118, 218, 318, reducing the sound of exhaust medium flowing through the vent assembly 100, 200, 300. The vent assemblies 100, 200 and 300 may further protect the digital valve positioner 14, 114 from external media by preventing an external medium from entering the check valves 108, 208, 308, 311 via the plurality of barriers 118, 218, 318 surrounding the check valves 108, 208, 308, 311 without affecting the flow capacity of the digital valve positioner 14, 114.

In addition, one of ordinary skill in the art will further understand that the design and distribution of the plurality of barriers 118, 218, 318 not only serve to protect each vent assembly 100, 200, 300 from direct impact from the environment and reduce noise levels, but also prevent significant pooling of water in the area of the check valves 108, 208, 308, 311 and the plurality of barriers 118, 218, 318. By preventing significant pooling of water, any freezing of such water is also prevented should the ambient temperature drop below freezing. In addition, each vent assembly 100, 200, 300 is self-draining, independent of orientation, by allowing the rain water, for example, that enters the area of the plurality of barriers 118, 218, 318 to pin ball through and drain out the opposite side of the vent assembly 100, 200, 300.

In view of the foregoing, one of ordinary skill in the art will further understand that each vent assembly 100, 200 and 300 may direct exhaust media through a plurality of apertures 116, 216 disposed around a bore 104, 204 of a body 102, 202, 302 of the vent assembly 100, 200, 300, into the check valves 108, 208, 308, 311 disposed within the bores 104, 204 and then radially outward into the plurality of barriers 118, 218, 318. One of ordinary skill in the art will also understand that each vent assembly 100, 200, 300 may reduce the sound level of exhaust medium flowing through the vent assemblies 100, 200, 300 by providing a tortuous flow path in both a cap 130, 230, and 330 and the plurality of barriers 118, 218, 318. One of ordinary skill will further understand that preventing external medium from entering the check valves 108, 208, 308, 311 without affecting the flow capacity of the digital valve positioner 14, 114 includes enclosing the check valve 108, 208, 308, 311 via both the cap 130, 230, 330 and the plurality of barriers 118, 218, 318.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described above, this disclosure is not intended to be limited thereto. Variations can be made to the disclosed examples that are still within the scope of the appended claims.

What is claimed:

1. A digital valve positioner for use with an actuator, the digital valve positioner comprising:
a housing;
at least one exhaust port opening formed in the housing;
a vent assembly operatively coupled to the at least one exhaust port opening, the vent assembly including:
a body operatively coupled to the at least one exhaust port opening, the body including a bore and an outer end surface and defining an inlet and an outlet, the bore disposed between the inlet and the outlet, and a plurality of apertures disposed in the outer end surface and around the bore,;
a valve seat surrounding the bore; and
a check valve disposed within the bore, the check valve arranged to shift from a closed position seated against the valve seat to an open position disposed away from the valve seat when an exhaust medium flows through the at least one exhaust port opening, the exhaust medium being directed through the plurality of apertures and into the check valve; and
a plurality of barriers disposed around the check valve and positioned to enclose the check valve, the plurality of barriers arranged to prevent an external medium from entering the check valve and to provide a tortuous flow path for the exhaust medium reducing sound through the vent assembly, the body disposed over the at least one exhaust port opening, and each barrier of the plurality of barriers including an elongate protrusion extending from the outer end surface of the body and having a first end and a second end, at least one of the first and second ends overlapping with one or more of the first or second ends of another elongate protrusion of the plurality of barriers to enclose the check valve.

2. The digital valve positioner of claim 1, the at least one exhaust port opening comprising two exhaust port openings, the body disposed over the at least two exhaust openings.

3. The digital valve positioner of claim 1, the vent assembly further comprising a cap disposed over the plurality of barriers to further enclose the check valve and reduce sound through the vent assembly, and a screen disposed between the body and the cap, the screen allowing the exhaust medium flowing through the plurality of barriers to be released to the atmosphere.

4. The digital valve positioner of claim 1, the check valve comprising an umbrella check valve.

5. The digital valve positioner of claim 1, the check valve positioned in the closed position, such that when the exhaust medium flows through the at least one exhaust port opening, the exhaust medium is directed through the plurality of apertures and into the check valve, shifting the check valve to the open position to release exhaust medium through the plurality of barriers and into the atmosphere.

6. The digital valve positioner of claim 1, the body further including a second bore, a second valve seat surrounding the second bore, and a second check valve disposed within the bore, the second check valve arranged to shift from a closed position seated against the valve seat to an open position disposed away from the valve seat when the exhaust medium flows through the at least one exhaust opening, and the plurality of barriers disposed around the second check valve and positioned to enclose the second check valve, preventing the external medium from entering the second check valve.

7. An actuator comprising:
an actuator housing; and
the digital valve positioner of claim 1, wherein the digital valve positioner is operatively connected to the actuator housing to convert an input signal to a pneumatic output pressure to the actuator.

8. A vent assembly for a digital valve positioner operatively coupled to an actuator, the vent assembly comprising:
a body having an inlet, an outlet, a bore disposed between the inlet and the outlet, a plurality of apertures surrounding the bore, a valve seat surrounding the plurality of apertures, the body adapted to be operatively secured to an exhaust port opening of the digital valve positioner;
an umbrella valve disposed within the bore, the umbrella valve biased in a closed position, such that the umbrella valve is shiftable between the closed position seated against the valve seat and an open position disposed away from the valve seat when an exhaust medium flows through the inlet of the body; and
an enclosure disposed around the umbrella valve and positioned to enclose the umbrella valve, the enclosure comprising a plurality of barriers arranged to prevent an external medium from entering the umbrella valve and to provide a tortuous flow path for the exhaust medium reducing sound through the vent assembly without affecting flow capacity,
the body including an outer end surface, the plurality of barriers extending from the outer end surface, each barrier of the plurality of barriers including an elongate protrusion having a first end and a second end, at least one of the first and second ends overlapping with one or more of the first or second ends of another barrier of the plurality of barriers to enclose the umbrella valve.

9. The vent assembly of claim 8, the enclosure further comprising a cap removably disposed over the plurality of barriers to further enclose the umbrella valve and reduce sound through the vent assembly, and a screen disposed between the plurality of barriers and the cap, the screen allowing the exhaust medium flowing through the tortuous flow path of the plurality of barriers to exit to the atmosphere.

10. The vent assembly of claim 8, the each barrier of the plurality of barriers comprising a post extending from a cap, the cap having a concave portion adapted to receive the umbrella valve when the umbrella valve is in an open position, the concave portion surrounded by the plurality of barriers, and each post offset from each of the other posts to enclose the umbrella valve.

11. The vent assembly of claim 8, the body further including a second bore, a second valve seat surrounding the second bore, and a second check valve disposed within the bore, the second check valve arranged to shift from a closed position seated against the valve seat to an open position disposed away from the valve seat when the exhaust medium flows through the at least one exhaust opening, and the plurality of barriers disposed around the second check valve and positioned to enclose the second check valve, preventing the external medium from entering the second check valve.

12. A method of venting a digital valve positioner operatively coupled to an actuator, the digital valve positioner comprising a housing and at least one exhaust port opening formed in the housing, the method comprising:
providing a vent assembly comprising a check valve surrounded by a plurality of barriers;
operatively securing the vent assembly to the at least one exhaust port opening;

directing an exhaust medium into the check valve and through the plurality of barriers, reducing the sound of the exhaust medium flowing through the vent assembly; and preventing an external medium from entering the check valve without affecting the flow capacity of the digital valve positioner, wherein directing the exhaust medium into the check valve and through the plurality of barriers comprises directing the exhaust medium through a plurality of apertures disposed around a bore of a body of the vent assembly, into the check valve disposed within the bore, and radially outward into the plurality of barriers, at least one barrier of the plurality of barriers including an elongate protrusion extending from the body and having a first end and a second end, at least one of the first and second ends overlapping with one or more of the first or second ends of another elongate protrusion of the plurality of barriers to enclose the check valve.

13. The method of claim 12, wherein operatively securing the vent assembly to the at least one exhaust port opening includes disposing the vent assembly over the at least one exhaust port opening and removably securing the vent assembly to the housing of the digital valve positioner via one or more of a bolt or other securing mechanism.

14. The method of claim 12, wherein reducing the sound of the exhaust medium flowing through the vent assembly comprises providing a tortuous flow path through which the exhaust medium flows, the tortuous flow path formed by a cap and the plurality of barriers.

15. The method of claim 12, wherein preventing an external medium from entering the check valve without affecting the flow capacity of the digital valve positioner comprises enclosing the check valve via a cap and the plurality of barriers surrounding the check valve.

16. A digital valve positioner for use with an actuator, the digital valve positioner comprising:
   a housing;
   at least one exhaust port opening formed in the housing;
   a vent assembly operatively coupled to the at least one exhaust port opening, the vent assembly including:
      a body operatively coupled to the at least one exhaust port opening, the body including a bore and an outer end surface and defining an inlet and an outlet, the bore disposed between the inlet and the outlet, and a plurality of apertures disposed in the outer end surface and around the bore,
      a valve seat surrounding the bore; and
      a check valve disposed within the bore, the check valve arranged to shift from a closed position seated against the valve seat to an open position disposed away from the valve seat when an exhaust medium flows through the at least one exhaust port opening, the exhaust medium being directed through the plurality of apertures and into the check valve; and
   a plurality of barriers disposed around the check valve and positioned to enclose the check valve, the plurality of barriers arranged to prevent an external medium from entering the check valve and to provide a tortuous flow path for the exhaust medium reducing sound through the vent assembly, and
   the check valve comprising an umbrella check valve.

17. An actuator comprising:
   an actuator housing; and
   a digital valve positioner operatively connected to the actuator housing to convert an input signal to a pneumatic output pressure to the actuator, the digital valve positioner comprising:
      a housing;
      at least one exhaust port opening formed in the housing;
      a vent assembly operatively coupled to the at least one exhaust port opening, the vent assembly including:
         a body operatively coupled to the at least one exhaust port opening, the body including a bore and an outer end surface and defining an inlet and an outlet, the bore disposed between the inlet and the outlet, and a plurality of apertures disposed in the outer end surface and around the bore;
         a valve seat surrounding the bore;
         a check valve disposed within the bore, the check valve arranged to shift from a closed position seated against the valve seat to an open position disposed away from the valve seat when an exhaust medium flows through the at least one exhaust port opening, the exhaust medium being directed through the plurality of apertures and into the check valve; and
         a plurality of barriers disposed around the check valve and positioned to enclose the check valve, the plurality of barriers arranged to prevent an external medium from entering the check valve and to provide a tortuous flow path for the exhaust medium reducing sound through the vent assembly.

\* \* \* \* \*

UNITED STATES PATENT AND TRADEMARK OFFICE
CERTIFICATE OF CORRECTION

PATENT NO. : 9,989,159 B2
APPLICATION NO. : 14/701072
DATED : June 5, 2018
INVENTOR(S) : Richard J. Winkler et al.

It is certified that error appears in the above-identified patent and that said Letters Patent is hereby corrected as shown below:

In the Specification

At Column 12, Line 58, "may be alternatively" should be -- may alternatively --.

In the Claims

At Column 15, Line 14, "bore,;" should be -- bore; --.

At Column 17, Line 47, "bore," should be -- bore; --.

Signed and Sealed this
Fourteenth Day of July, 2020

Andrei Iancu
*Director of the United States Patent and Trademark Office*